United States Patent
Akiyoshi

(10) Patent No.: US 9,479,701 B2
(45) Date of Patent: Oct. 25, 2016

(54) IMAGE REPRODUCING APPARATUS, IMAGE REPRODUCING METHOD, IMAGE CAPTURING APPARATUS, AND STORAGE MEDIUM

(71) Applicant: CANON KABUSHIKI KAISHA, Tokyo (JP)

(72) Inventor: Hidenobu Akiyoshi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/834,476

(22) Filed: Aug. 25, 2015

(65) Prior Publication Data

US 2016/0094788 A1    Mar. 31, 2016

(30) Foreign Application Priority Data

Sep. 26, 2014   (JP) ................................ 2014-196836

(51) Int. Cl.
    *H04N 5/232* (2006.01)

(52) U.S. Cl.
    CPC ...... *H04N 5/23267* (2013.01); *H04N 5/23229* (2013.01); *H04N 5/23293* (2013.01); *H04N 5/23296* (2013.01)

(58) Field of Classification Search
    CPC ...... H04N 5/144; H04N 5/145; H04N 5/147; H04N 5/23267; H04N 5/23299; H04N 5/23293; H04N 5/23296; H04N 5/23251; H04N 5/23524; H04N 5/23264; H04N 5/2628; H04N 3/1562; G06T 7/20
    USPC ...................................................... 348/208.6
    See application file for complete search history.

(56) References Cited

U.S. PATENT DOCUMENTS

| | | | | |
|---|---|---|---|---|
| 8,260,118 B2 * | 9/2012 | Okada | ................ | G06K 9/00261 386/242 |
| 2005/0057661 A1 * | 3/2005 | Tanaka | ............... | H04N 5/23248 348/208.99 |
| 2008/0111889 A1 * | 5/2008 | Fujita | ..................... | H04N 5/145 348/208.5 |
| 2010/0149353 A1 * | 6/2010 | Jang | .................... | H04N 5/23296 348/208.12 |
| 2010/0183277 A1 * | 7/2010 | Okada | ............... | G06K 9/00261 386/271 |
| 2010/0277620 A1 * | 11/2010 | Iijima | ................ | H04N 5/23232 348/240.1 |
| 2010/0295970 A1 * | 11/2010 | Suzuki | ................... | H04N 5/232 348/240.3 |
| 2011/0229110 A1 * | 9/2011 | Sugihara | ................ | H04N 5/781 386/278 |
| 2014/0313354 A1 * | 10/2014 | Kusanagi | ........... | H04N 5/23267 348/208.6 |

FOREIGN PATENT DOCUMENTS

JP          H07-143380 A        6/1995

* cited by examiner

*Primary Examiner* — Pritham Prabhakher

(74) *Attorney, Agent, or Firm* — Fitzpatrick, Cella, Harper & Scinto

(57) ABSTRACT

The invention provides an image reproducing apparatus in which a zoom corresponding to a degree of a shake is adjusted in a reproduction vibration-proofing upon reproduction of a moving image and a proper angle of view can be cut out and displayed. An image reproducing apparatus has: a storing unit for storing a moving image and shake information; a reproduction vibration-proofing unit for electronically executing a reproduction vibration-proofing based on shake information; and a control unit for setting a reproduction vibration-proofing term and a second zoom magnification for a reproduction vibration-proofing term different from a first zoom magnification which is used in a term without a reproduction vibration-proofing based on a shake information, wherein a control unit provides a change term for changing from one of first and second zoom magnifications to the other before and/or after a reproduction vibration-proofing term.

11 Claims, 5 Drawing Sheets

WHEN SHAKES ARE ADJACENT A PLURALITY OF NUMBER OF TIMES

WHEN SHAKE EXISTS AT THE START OF RECORDING OF IMAGE

IMAGE REPRODUCING APPARATUS, IMAGE REPRODUCING METHOD, IMAGE CAPTURING APPARATUS, AND STORAGE MEDIUM

BACKGROUND OF THE INVENTION

1. Field of the Invention

The present invention relates to an image reproducing apparatus which can reproduce a moving image and, more particularly, to an image reproducing apparatus having a function for vibration-proofing a shake area, at the time of reproduction, included in a moving image photographed by an image capturing apparatus such as a digital video camera or the like.

2. Description of the Related Art

In recent years, generally, a moving image is photographed by using a digital video camera. The user can easily photograph the moving image by using the digital video camera and can input the photographed moving image into a personal computer (hereinbelow, referred to as a PC). The digital video camera generally has a reproducing mode and a recording mode. In the reproducing mode, the user can easily select a reproduction target by an index display where representative images which represent the moving image are arranged and displayed.

When the user reproduces a moving image, since there is a case where a term in which a shake at the time of photographing is larger exists in the moving image, the moving image looks poor. As a method of improving a shake in the reproduction of the moving image including the shake, there is a method called "reproduction vibration-proofing". The reproduction vibration-proofing is a method whereby by slightly zooming an angle of view at the time of recording to a telephoto side upon reproduction, an image area cut out by the zooming is used as an area for vibration-proofing. In the case of performing the reproduction vibration-proofing upon reproduction of a moving image, the moving image is preliminarily analyzed and to which extent the angle of view is zoomed to the telephoto side is decided.

As an example of realizing the reproduction vibration-proofing by making an angle of view of a display narrower than that upon photographing and reproducing a moving image (zooming to a telephoto side), there is a related art disclosed in Japanese Patent Application Laid-Open No. H07-143380. Such a related art discloses such a technique that in order to correct a shake, the angle of view of the display is set to be narrower than that upon recording and a vibration-proofing area is obtained.

However, according to the related art, there is such a problem that an angle of view upon reproduction is smaller than that upon photographing at a predetermined rate in a period of time from the beginning to the end of the reproduction, of a moving image, and even in a portion where no shake occurs, an angle of view smaller than that upon photographing is displayed. Even if there is a term in which no shake occurs during the reproduction, since the reproduction vibration-proofing is applied, a peripheral portion of the angle of view upon recording is not displayed in such a term. Although the reproduction vibration-proofing is unnecessary, the zooming of the reproduction vibration-proofing is performed and the peripheral portion of the angle of view upon recording is not seen, so that it is inconvenient to the user.

In consideration of the foregoing problems, it is an aspect of the invention to provide an image reproducing apparatus in which a zoom corresponding to a degree of a shake is adjusted in a reproduction vibration-proofing upon moving image reproduction and a proper angle of view can be cut out and displayed.

SUMMARY OF THE INVENTION

According to an aspect of the invention, there is provided an image reproducing apparatus comprising: a storing unit configured to store a moving image and shake information of the moving image; a reproduction vibration-proofing unit configured to electronically execute a reproduction vibration-proofing on a basis of the shake information during a reproduction of the moving image; and a control unit configured to set a reproduction vibration-proofing term in which the reproduction vibration-proofing is performed and a second zoom magnification which is used in the reproduction vibration-proofing term and differs from a first zoom magnification which is used in a term in which the reproduction vibration-proofing is not performed into the moving image on a basis of the shake information, wherein the control unit provides a change term in which a zoom magnification is changed from one of the first and second zoom magnifications to the other into at least one of periods before and after the reproduction vibration proofing term.

According to another aspect of the invention, there is provided an image reproducing method comprising: setting a reproduction vibration-proofing term in which a reproduction vibration-proofing is performed and a second zoom magnification which is used in the reproduction vibration-proofing term and differs from a first zoom magnification which is used in a term in which the reproduction vibration-proofing is not performed into a moving image on a basis of the shake information of the moving image to be reproduced; providing a change term in which a zoom magnification is changed from one of the first and second zoom magnifications to the other into at least one of periods before and after the reproduction vibration-proofing term; and electronically executing the reproduction vibration-proofing on a basis of the shake information in the reproduction vibration-proofing term According to still another aspect of the invention, there is provided a non-transitory computer-readable storage medium storing a program for causing a computer to execute setting a reproduction vibration-proofing term in which a reproduction vibration-proofing is performed and a second zoom magnification which is used in the reproduction vibration-proofing term and differs from a first zoom magnification which is used in a term in which the reproduction vibration-proofing is not performed into a moving image on a basis of the shake information of the moving image to be reproduced; providing a change term in which a zoom magnification is changed from one of the first and second zoom magnifications to the other into at least one of periods before and after the reproduction vibration-proofing term; and electronically executing the reproduction vibration-proofing on a basis of the shake information in the reproduction vibration-proofing term during the reproduction of the moving image.

According to the invention, the reproduction vibration-proofing is performed only in a range where there is a shake in the reproduction vibration-proofing in the moving image and the moving image can be displayed at an angle of view upon recording in the other range. Further, the reproduced moving image can be displayed so that a sudden screen change does not occur in an interval between the term in which the reproduction vibration-proofing is performed and the term in which the reproduction vibration-proofing is not performed.

Further features of the present invention will become apparent from the following description of exemplary embodiments with reference to the attached drawings.

DESCRIPTION OF THE EMBODIMENTS

Preferred embodiments of the present invention will now be described in detail hereinbelow with reference to the accompanying drawings.

First Embodiment

Figure 1:
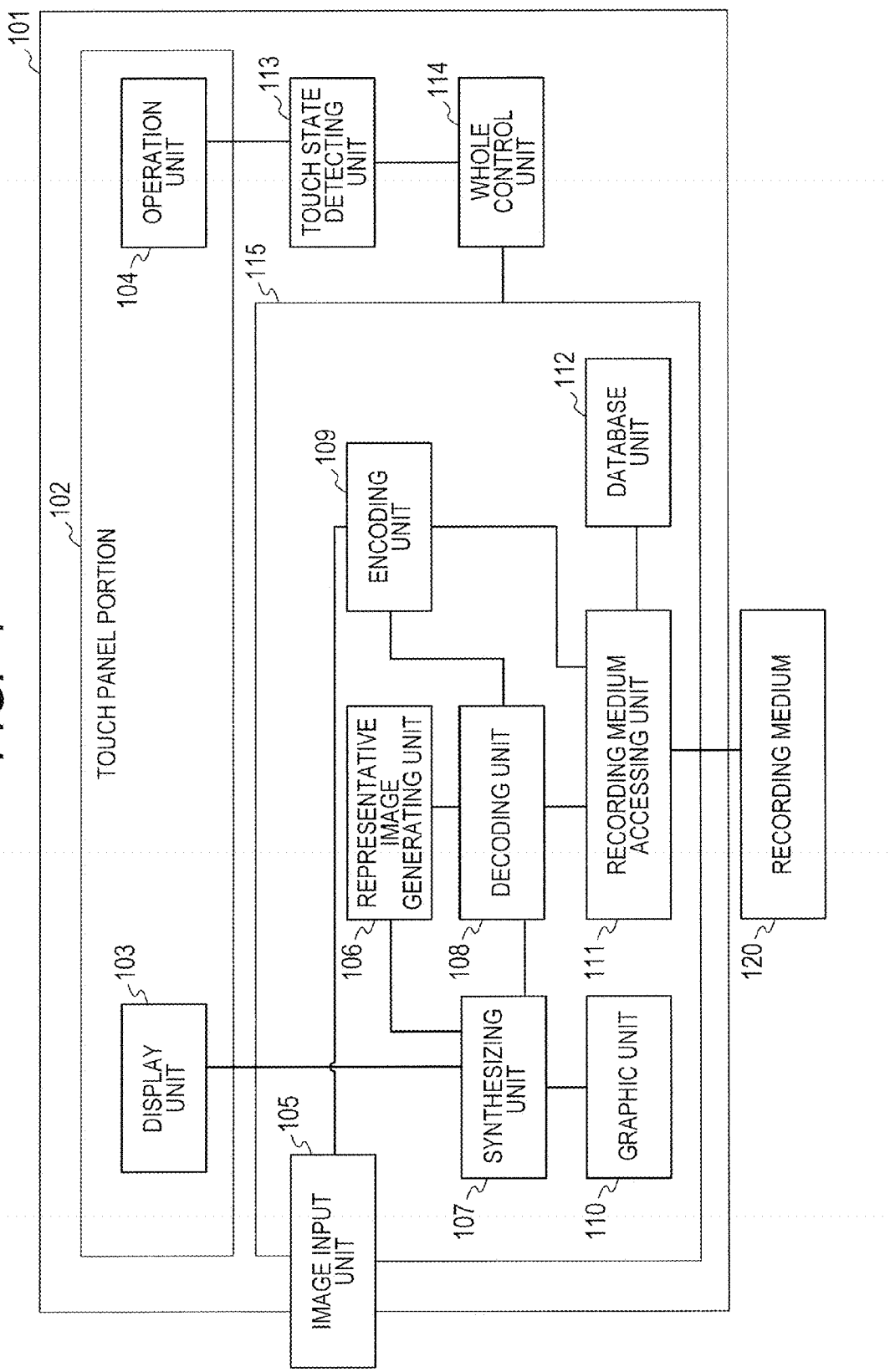
FIG. 1 is a block diagram illustrating a construction of an image capturing apparatus to which an image reproducing apparatus according to the first embodiment is applied.

The first embodiment of the invention will be described hereinbelow with reference to the drawings. FIG. 1 is a diagram illustrating a construction of an image capturing apparatus 101 such as a digital video camera or the like to which an image reproducing apparatus according the embodiment is applied. The image capturing apparatus 101 has a touch panel portion 102. The touch panel portion 102 has a display unit 103 and an operation unit 104. The display unit 103 displays an image photographed by the image capturing apparatus 101 and displays instruction buttons to the user. The display unit 103 also displays information regarding the image capturing apparatus, a remaining capacity of a recording medium, and the like. The operation unit 104 receives a user's instruction from a button displayed on a touch panel.

The image capturing apparatus 101 has a basic portion 115. The basic portion 115 has an image input unit 105, a representative image generating unit 106, a synthesizing unit 107, a decoding unit 108, an encoding unit 109, a graphic unit 110, a recording medium accessing unit 111, and a database unit 112. When the image capturing apparatus 101 performs a photographing, an external image is input from the image input unit 105. The synthesizing unit 107 synthesizes character information which is displayed to the display unit 103 of the touch panel, representative images of still images generated by the representative image generating unit 106, and the like. The decoding unit 108 decodes image data recorded in a recording medium. Upon recording of an image, the encoding unit 109 encodes the image input from the image input unit 105. The encoding unit 109 can also encode an image decoded by the decoding unit 108. The encoding unit 109 can also encode an original image again and record an image of a different angle of view. The graphic unit 110 generates a screen for displaying various kinds of information of the image capturing apparatus 101 to the display unit 103. For example, the graphic unit 110 draws information such as clock, battery remaining level, recording medium remaining capacity, the number of recorded images, and the like. The recording medium accessing unit 111 is an interface for recording data into the recording medium at the time of image recording and reproducing the data from the recording medium at the time of image reproduction. The database unit 112 reads out related information among the images included in the recording medium from the recording medium and holds.

Further, the image capturing apparatus 101 has a touch state detecting unit 113 and a whole control unit 114. The touch state detecting unit 113 detects the number of fingers of the user which are in contact with the touch panel, their contact positions, and the like. The whole control unit 114 properly controls each block of the basic portion 115 of the image capturing apparatus in accordance with the operation upon recording or reproduction. The whole control unit 114 loads a control program stored in a memory (not shown) and executes, thereby controlling each unit of the basic portion 115 and executing each process necessary for the reproduction vibration-proofing, which will be described hereinlater. A recording medium 120 is connected to the image capturing apparatus 101. The recording medium 120 is a detachable recording medium in the embodiment and can be inserted into the image capturing apparatus 101.

Figure 2:
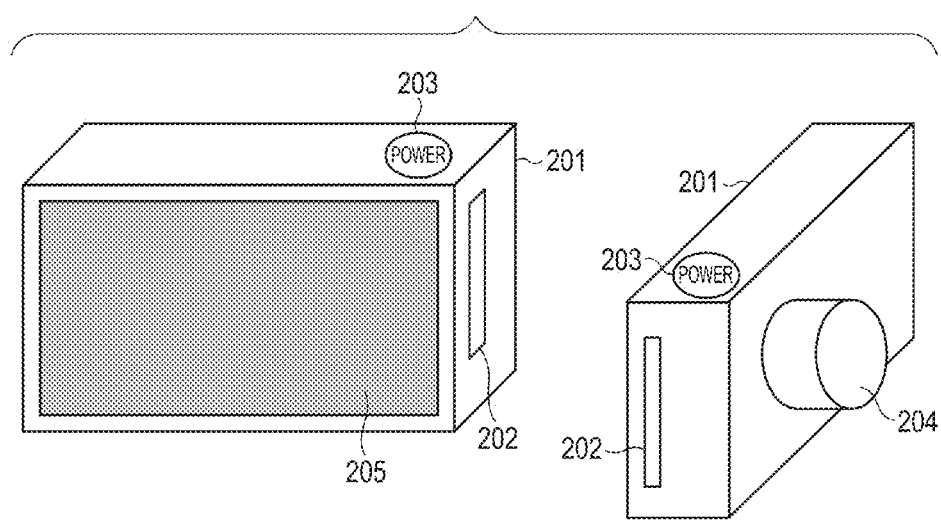
FIG. 2 is a diagram illustrating a schematic view of the image capturing apparatus of FIG. 1.

FIG. 2 is a diagram illustrating a schematic view of the image capturing apparatus 101. The image capturing apparatus 101 has a casing 201. An inserting port 202 of the recording medium 120 is formed in a side surface of the casing 201. The recording medium 120 is inserted from the inserting port 202. A power button 203 is provided on an upper surface of the casing 201. The power button 203 is a button to turn on or off a main power source of the image capturing apparatus 101. A lens barrel portion 204 having a lens is provided on a front surface of the casing 201. A touch panel 205 is provided on a rear surface of the casing. 201. The operation such as instruction for recording or reproduction, instruction for editing, or the like is executed by using the touch panel 205.

Figure 3:
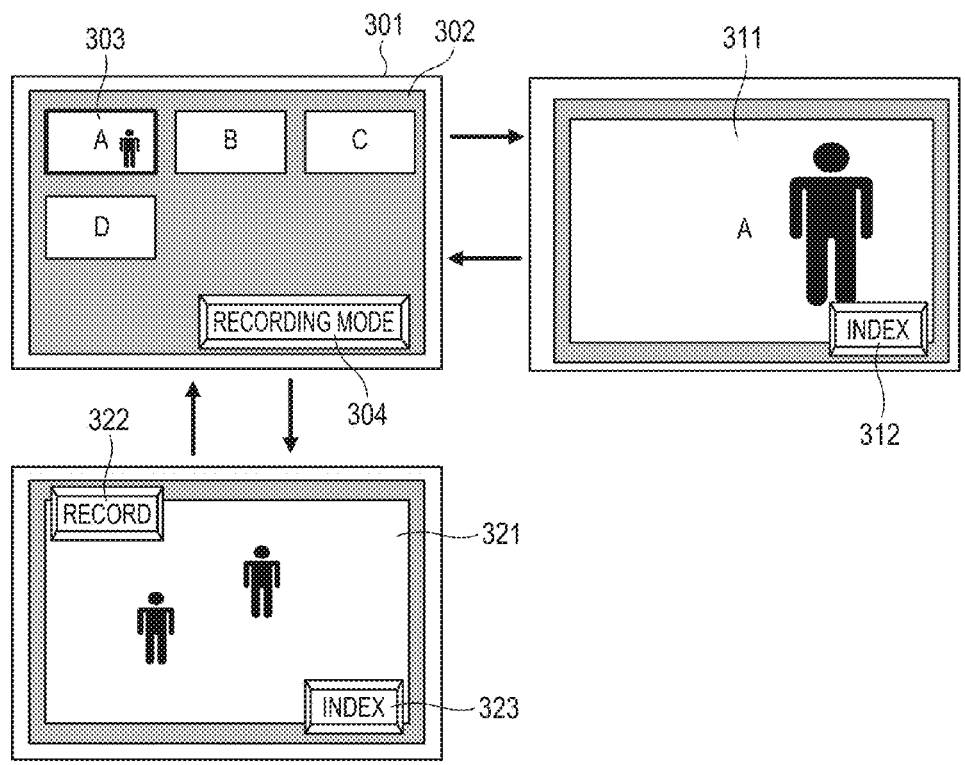
FIG. 3 is a diagram illustrating user interface screens which are displayed in the image capturing apparatus of FIG. 1 and transition relations among them.

FIG. 3 is a diagram for describing screens which are displayed on the touch panel. As illustrated in FIG. 3, a touch panel 302 is provided on one surface of a casing 301 of the image capturing apparatus 101. When the image capturing apparatus 101 is in an INDEX mode, the image capturing apparatus 101 reads out images from the recording medium 120 and displays a list of representative images (thumbnails) 303 of the images onto the touch panel 302. In FIG. 3, for example, four representative images 303 corresponding to images A, B, C, and D are displayed. A button 304 to shift from the INDEX mode to the recording mode is displayed on the touch panel 302. When the user selects the representative image 303 corresponding to the image A, the image A is displayed on the whole screen of the touch panel 302 and the reproduction is started. An image 311 is the image A displayed on the whole screen. A button 312 to return to the INDEX mode is displayed on the touch panel 302.

When the user depresses the recording mode button 304, the image capturing apparatus 101 is shifted to the recording mode. An external image 321 which entered a sensor through the lens is displayed on the touch panel 302. A photograph button 322 to start the recording by touching is displayed on the touch panel 302. By touching the photograph button 322 again during the recording, the recording is stopped. Further, a button 323 to return to the INDEX mode is displayed on the touch panel 302.

Figure 4:
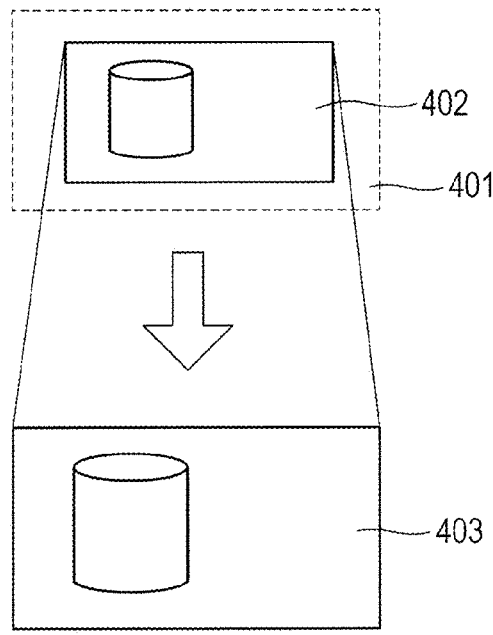
FIG. 4 is a diagram for describing a reproduction vibration-proofing method.

FIG. 4 is a diagram for describing a vibration-proofing frame at the time of performing the vibration-proofing. When the vibration-proofing is performed, an area 402 as a vibration-proofing target is smaller than a whole area 401 of the frame upon recording. Therefore, when the reproduction is actually performed, the image capturing apparatus 101 displays a frame image 403 obtained by enlarging the frame 402. Thus, an image which is slightly zoomed to the telephoto direction is displayed in the vibration-proofing term at the time of the reproduction vibration-proofing.

Although the image slightly zoomed to the telephoto direction is displayed in the vibration-proofing term (term in which the vibration-proofing is performed), the image is reproduced at a normal angle of view in the other term (term in which the vibration-proofing is not performed). Therefore, upon reproduction, if a reproducing position approaches the vibration-proofing term, from the term in, which the vibration-proofing is not performed, the image slightly zoomed to the telephoto direction is suddenly displayed, so that the image looks poor for the user. In order to prevent such a sudden change in angle of view from occurring, in the embodiment, in the case of zooming to the telephoto direction (or vice versa), a buffer term (also referred to as a change term) of a predetermined time is provided. In the buffer term, control is made so as to gradually zoom at a predetermined zoom magnification (that is, gradually increase or decrease the zoom magnification), thereby preventing the image from looking poor for the user. Processes for performing the reproduction vibration-proofing in accordance with a shake state in the reproduction target moving image, deciding the reproduction vibration-proofing term, and deciding the buffer term between the reproduction vibration-proofing term and the normal angle of view will be described hereinbelow.

Figure 5:
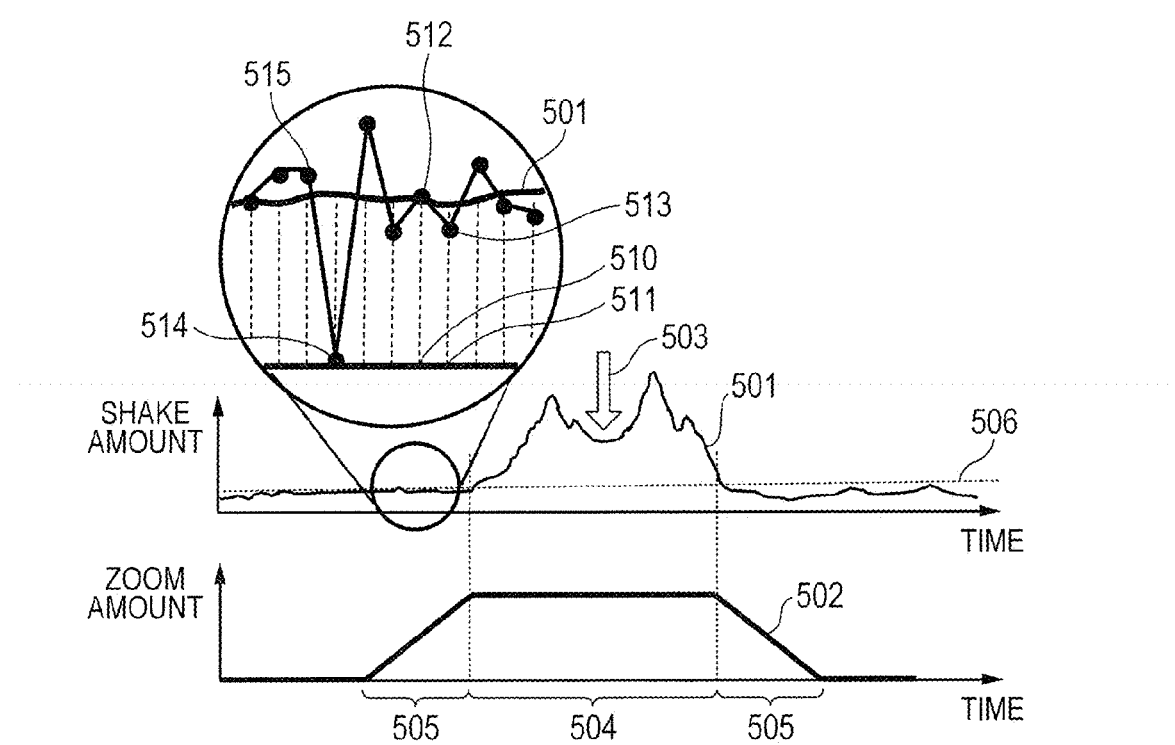
FIG. 5 is a diagram for describing a relation between a shake of a moving image and a reproduction vibration-proofing term according to the first embodiment.

A case where the user starts the photographing in a state were the user grasped the image capturing apparatus 101 and is at rest, starts walking after a little while, is at rest after the elapse of a predetermined time after that, stops the photographing, and reproduces the recorded moving image will now be considered. FIG. 5 is a diagram illustrating a shake amount of the moving image which is reproduced in this case and the reproduction vibration-proofing term which is set according to the embodiment.

In FIG. 5, a shake amount 501 as shake information is a shake amount of the moving image recorded by the image capturing apparatus 101. A shake of the portion photographed while the user is walking in the moving image is larger than that in the other portion. The shake amount 501 is calculated, for example, by using a moving vector upon reproduction. A calculating method is as follows.

First, the image capturing apparatus 101 performs a vector synthesis of the moving vector of the Nth frame of the moving image and obtains the moving vector of such a frame. Subsequently, the image capturing apparatus 101 performs a vector synthesis of the moving vector of the (N+1)th frame and obtains the moving vector of such a frame. The image capturing apparatus 101 compares the moving vectors of the frames. If an angle between the synthesized vectors is equal to or larger than 120°, it is determined that the (N+1)th frame has a shake to the Nth frame. It is assumed that a magnitude of a shake amount is set to a magnitude of the vector of the frame which was determined that there is a shake. The shake amount is decided by using the moving vectors as mentioned above.

Returning to FIG. 5, a magnitude of the moving vector in a time 510 in which the Nth frame is reproduced is shown by a black dot 512. Similarly, a magnitude of the moving vector in a time 511 in which the (N+1)th frame is reproduced is shown by a black dot 513. The image capturing apparatus 101 compares the (N+1)th frame with the Nth frame and determines whether or not there is a difference of 120° or more as an angle between the moving vectors of the frames. If it is decided that there is the difference of 120° or more, the image capturing apparatus 101 decides that the moving vector has a shake. Such a magnitude of the moving vector is plotted as a shake amount. In the embodiment, it is assumed that there is the difference of 120° or more as an angle between the moving vectors of the (N+1)th frame and the Nth frame. The magnitude of the moving vector of the (N+1)th frame is plotted (black dot 513).

With respect to a frame in a reproducing time 514, since the moving vector faces the same direction as that of a frame in a reproducing time 515, it is recognized that the image capturing apparatus has moved instead of the shake of the image. In such a case, the image capturing apparatus 101 plots the shake amount as 0 as shown by the black dot 514.

The image capturing apparatus 101 performs a low-pass filtering to the plots of those shake amounts, thereby obtaining a time-dependent change of the shake amount 501. On the basis of a relation between the time and the change of the shake amount obtained as mentioned above, the image capturing apparatus 101 detects a term in which the shake amount increases as a reproduction. vibration-proofing term and performs the reproduction vibration-proofing as will be described hereinafter. In the reproduction vibration-proofing, a reproduction zoom is performed upon reproduction in accordance with a zoom amount 502 set as illustrated in FIG. 5. Details of the setting of the zoom amount will be described hereinafter together with details of the decision of the reproduction vibration-proofing term.

Figure 6:
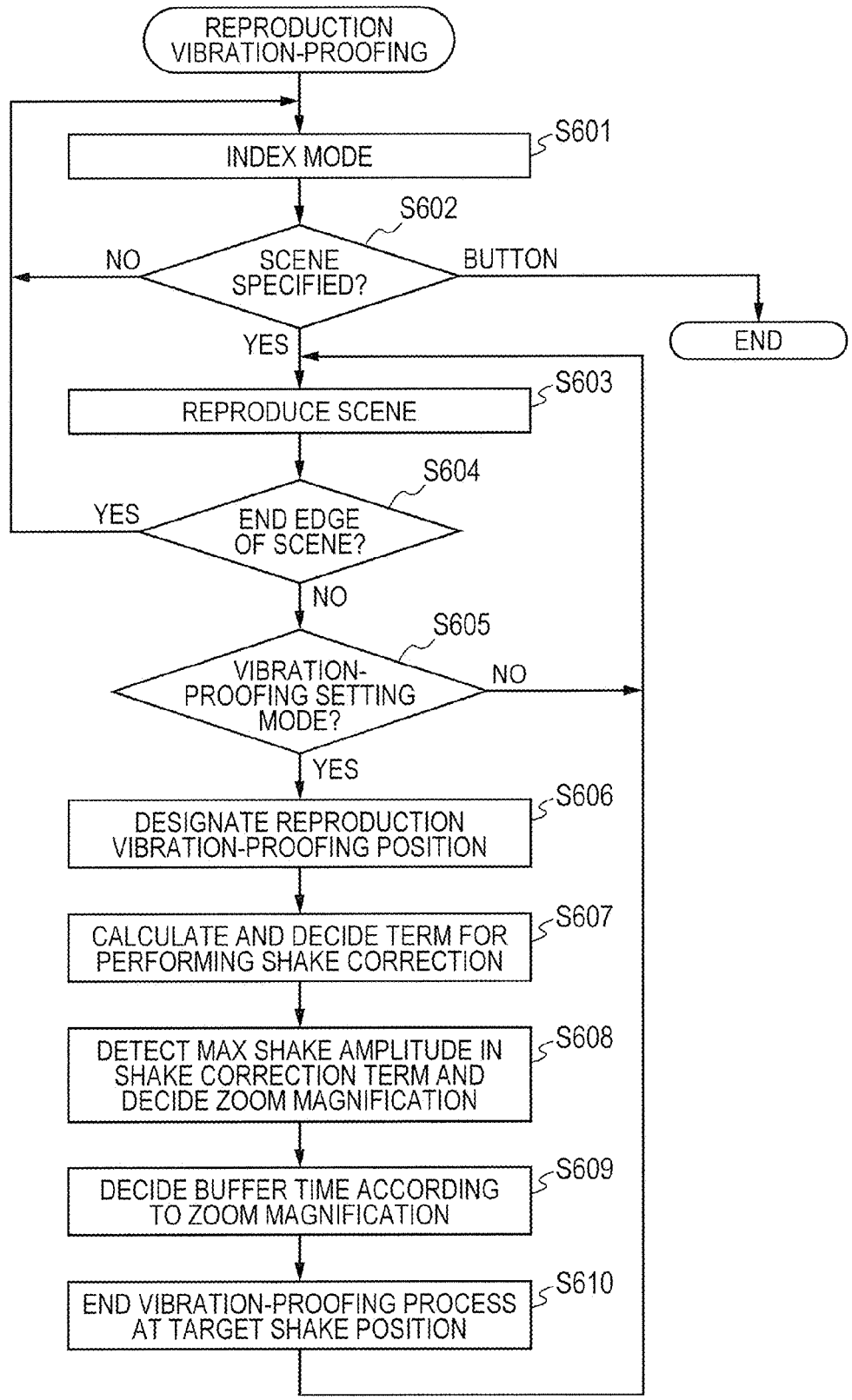
FIG. 6 is a diagram illustrating a flowchart for the reproduction vibration-proofing operation of the image reproducing apparatus according to the first embodiment.

Subsequently, the processing operation of the reproduction vibration-proofing according to the embodiment mentioned above will be described with reference to FIG. 6. FIG. 6 is a diagram illustrating a flowchart for the reproduction vibration-proofing operation in the image reproducing apparatus (image capturing apparatus 101) according to the embodiment. The reproduction vibration-proofing operation is realized by a method whereby the whole control unit 114 executes a control program and controls necessary arithmetic operating processes and each unit of the basic portion 115.

First, the user depresses the button of the INDEX mode (for example, button 312) of the image capturing apparatus 101. Thus, the reproduction vibration-proofing operation is started. In step S601, the image capturing apparatus 101 displays a list of the representative images (thumbnails) 303 of the moving images illustrated in FIG. 3. In step S602, the image capturing apparatus 101 determines whether or not the user has touched a thumbnail of a target scene which the user wants to reproduce. If it is determined that the user does not touch the thumbnail, the image capturing apparatus 101 repeats the determination about the touch of the thumbnail in the INDEX mode state and waits. If it is determined that the thumbnail has been touched, the processing routine advances to step S603. If the touched button is the recording mode button 304, the reproduction vibration-proofing operation is finished.

In step S603, the image capturing apparatus 101 starts the reproduction of the moving image of the target scene and advances to step S604. The image capturing apparatus 101 always calculates a shake amount between the present frame and the previous frame during the reproduction and prepares for the reproduction vibration-proofing process. The image capturing apparatus 101 displays a vibration-proofing setting button to set the reproduction vibration-proofing term onto the screen during the reproduction. In step S604, the image capturing apparatus 101 determines whether or not the reproduction of the selected scene has reached an end edge. If it has reached the end edge, the processing routine is returned to step S601. The image capturing apparatus 101 displays the list of the representative images (thumbnails) of the INDEX mode and waits in order to determine whether or not the thumbnail has been selected.

If the reproduction of the scene does not reach the end edge, step S605 follows and the image capturing apparatus 101 determines whether or not the user has touched the vibration-proofing setting button. Since the vibration-proofing setting button is displayed on the screen in the reproducing state, if the user is aware of the shake of the moving image during the reproduction, the user can touch (depress) the vibration-proofing setting button. If the vibration-proofing setting button is not touched in step S605, the processing routine is returned to step S603. The image capturing apparatus 101 continues the reproduction and the determination about the touch of the vibration-proofing setting button.

It is now assumed that since the shake is remarkable during the moving image reproduction, the user touched the vibration-proofing setting button on the screen at a point of time shown by an arrow 503 in FIG. 5. Thus, the processing operation advances to step S606. The image capturing apparatus 101 determines a start point in the moving image as a reproduction vibration-proofing target in accordance with the reproduction time point (position in the moving image) shown by the arrow 503. The image capturing apparatus 101 displays advance information during the reproduction vibration-proofing and holds the moving image into a temporary stop state. After completion of the reproduction vibration-proofing process, the image capturing apparatus 101 notifies the user of the completion, cancels temporary stop state, and returns to the reproducing state.

In order to detect the reproduction vibration-proofing term in step S607, the image capturing apparatus 101 detects the shake amount of the moving image by using the start point decided in step S606 as a reference. As a method of detecting the shake amount, the image capturing apparatus 101 scans the shake amount to an earlier direction of a time base (past direction of the time base) of the moving image by using the start point decided in step S606 as a reference point while comparing with a threshold value. As mentioned above, since the shake amount is always calculated during the reproduction, the shake amount can be easily scanned to the earlier direction of the time base. The image capturing apparatus 101 sets a term in which an average of the shake amounts in a predetermined time is equal to or larger than the threshold value into a reproduction vibration-proofing target term during the scanning, and stops the scanning at a point of time when the average of the shake amounts in the predetermined time is smaller than the threshold value. A broken line 506 in FIG. 5 indicates the foregoing threshold value. A reason why the average of the shake amounts in the predetermined time is calculated is to prevent a local influence of an amplitude of the shake. When the shake amount is scanned, the image capturing apparatus 101 always holds the maximum shake amount. Subsequently, the image capturing apparatus 101 scans a shake amount while detecting it to a later direction of the time base (future direction of the time base) by using the start point decided in step S606 as a reference point. The scanning is stopped at a point of time when the average of the shake amounts in the predetermined time is smaller than the threshold value as mentioned above. In this manner, a term 504 illustrated in FIG. 5 is detected as a reproduction vibration-proofing target term in step S607. At this time, the maximum shake amount in the reproduction vibration-proofing target term has already been detected.

Subsequently, in step S608, the image capturing apparatus 101 calculates a maximum zoom magnification by using the maximum shake amount as a reference. When the shake amount is large, the zoom magnification is also large. In step S609, a buffer term as a period 505 illustrated in FIG. 5 is set to periods before and after the reproduction vibration-proofing term corresponding to the decided zoom magnification. The period of time of the moving images corresponding to the buffer time which is set as mentioned above is a buffer term (change term). The larger the zoom magnification is, the buffer time is set to be longer. In the embodiment, control is made in such a manner that a predetermined zoom speed is always obtained by allowing the time of the buffer term and the maximum zoom magnification corresponding to the maximum shake amount in the reproduction vibration-proofing term to satisfy the following conditions.

Buffer term=constant×maximum zoom magnification

The buffer time is a time for preventing an angle of view of the reproduced image from being suddenly changed from the normal angle of view to the angle of view (zooming direction) for the reproduction vibration-proofing. The larger the maximum shake amount is, the buffer time is set to be longer, thereby preventing a sudden change in angle of view from looking. Like a period 505 illustrated in FIG. 5, a width of the predetermined time is provided for the periods before and after the reproduction vibration-proofing term, thereby setting a zoom amount upon transition between the reproduction vibration-proofing term and the term in which the reproduction vibration-proofing is not performed so as not to be suddenly changed. That is, in the buffer term which is set before the reproduction vibration-proofing term, the image capturing apparatus 101 gradually increases the zoom amount from a zoom amount (first zoom magnification) which is used in the term in which the reproduction vibration-proofing is not performed to a zoom amount (second zoom magnification larger than the first zoom magnification) which is used in the reproduction vibration-proofing term. On The other hand, in the buffer term which is set after the reproduction vibration-proofing term, the image capturing apparatus 101 gradually decreases the zoom amount from the second zoom magnification to the first zoom magnification. The image capturing apparatus 101 stores the reproduction vibration-proofing term and the buffer term together with the target moving image.

In step S610, the image capturing apparatus 101 finishes the reproduction vibration-proofing operation and notifies the user of the completion of the operation After that, the processing routine is returned to step S603 and the image capturing apparatus 101 automatically continues the reproduction. By also repeating the foregoing procedure to the other shake portion about which the user is anxious, the user can set such a portion as a reproduction vibration-proofing portion. When the portion set as a reproduction vibration-proofing portion is substantially reproduced, it is displayed in a state where such a portion has automatically been vibration-proofing processed.

The shake amount which is used as shake information of the image to be reproduced so far has been set as a change amount of the moving vector between the frames constructing the moving image. However, the digital video camera also records an output value of an angular velocity sensor together with the moving image at the time of recording the moving image and, further, by reading out such an output value upon reproduction, a change in angular velocity may be used as shake information for the reproduction vibration-proofing.

According to the first embodiment of the invention mentioned above, in the reproduction vibration-proofing in the moving image, the reproduction vibration-proofing is performed only in a range with a shake, and in the other range, the image can be displayed at the angle of view upon recording. Further, the reproduced moving image can be displayed so that a sudden screen change does not occur in a period between the term in which the reproduction vibration-proofing is performed and the term in which the reproduction vibration-proofing is not performed. Therefore, even if the reproduction vibration-proofing is performed during the moving image reproduction, such a situation that the user experiences an unwell feeling in the displayed image can be avoided.

Modification of the First Embodiment

Although the construction in which the reproduction vibration-proofing term is set in a plurality of portions of the moving image has been described in the first embodiment, the first embodiment supposes the case where there are no neighboring shakes in the periods before and after the reproduction vibration-proofing term. When the shake is local, the buffer term (change term) can be provided in accordance with the first embodiment. However, there is a case where when reproduction vibration proofing term is newly set, its buffer term overlaps with a buffer term of another reproduction vibration-proofing term which has already been set, and the buffer term cannot be sufficiently provided. Also at the start or end of the moving image, there is a case where the buffer term cannot be sufficiently provided. The modification discloses modified form of the reproduction vibration-proofing apparatus according to the first embodiment which can set a reproduction vibration-proofing term even in such a case. A construction of the reproduction vibration-proofing apparatus according to the modification will be described hereinbelow with reference to FIGS. 7A and 7B. Also in this modification, a case where an image reproducing apparatus of the modification is realized in the image capturing apparatus 101 of FIG. 1 is presumed, and a construction in such a case is similar to that in FIG. 1. A flowchart for the reproduction vibration-proofing operation is substantially the same as the flowchart in FIG. 6 of the first embodiment and a setting method of the buffer time in step S609 differs merely.

Figure 7A:
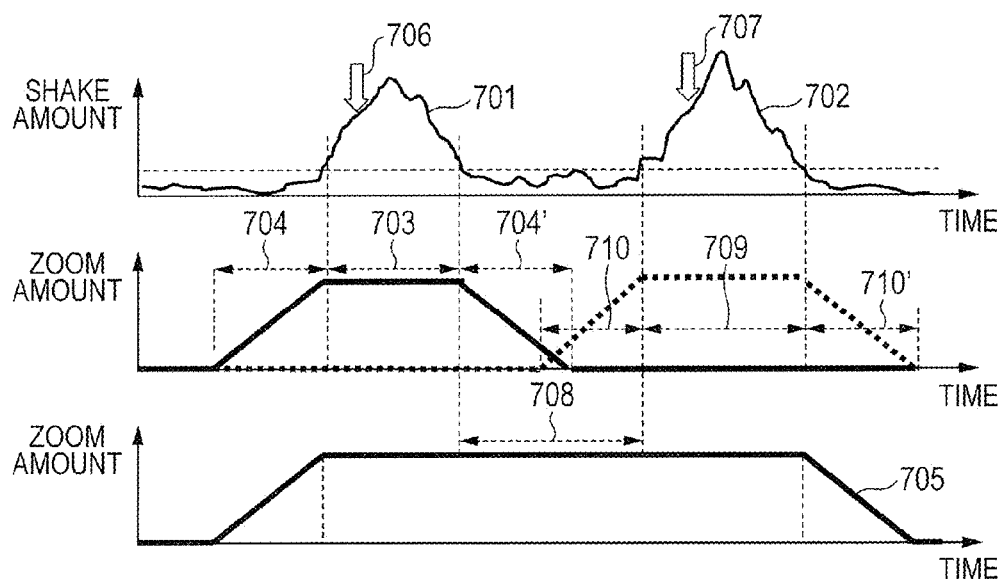
FIG. 7A is a diagram for describing a setting of a reproduction vibration-proofing term by an image reproducing apparatus according to a modification of the first embodiment.

First, a case where a plurality of shakes are adjacent will be described with reference to FIG. 7A.

When a plurality of shakes are adjacent, as a result of that the reproduction vibration-proofing was performed to each shake, if their buffer terms are neighboring or overlap, the plurality of shakes are handled as one large shake term. A method of setting the reproduction vibration-proofing term and the buffer term in such a case will be described with reference to FIG. 7A. In the diagram, a first shake 701 and a second shake 702 are two shakes which are adjacent to each other. When the user designates one point 706 in the period of the first shake 701, the image reproducing apparatus (image capturing apparatus 101) according to the modification determines a reproduction vibration-proofing term 703 and buffer terms 704 and 704' provided before and after the reproduction vibration-proofing term 703 while detecting the shake amounts in a manner similar to the first embodiment.

In this state, the user designates one point 707 in the period of the second shake 702. Thus, the image capturing apparatus 101 determines a reproduction vibration-proofing term 709 while detecting the shake amounts in a manner similar to the first embodiment. However, when a buffer term 710 which is set before the reproduction vibration-proofing term 709 is decided, the image capturing apparatus 101 according to the modification determines whether or not there is a portion which overlaps with the buffer term 704' after the reproduction vibration-proofing term 703 which has already been set. Thus, if there is the overlap portion, the image capturing apparatus 101 does not provide the buffer term 710 before the reproduction vibration-proofing term 709, also cancels the buffer term 704' after the reproduction vibration-proofing term 703, and updates the reproduction vibration-proofing term so as to couple the reproduction vibration-proofing terms 703 and 709. Consequently, as illustrated in the bottom stage of FIG. 7A, a new reproduction vibration-proofing term including a term 708 between the reproduction vibration-proofing terms 703 and 709 is added to the reproduction vibration-proofing terms 703 and 709. A buffer term 705 is set after such a new term. As mentioned above, in the modification, since a buffer term is not provided for the term 708 in which the buffer terms overlap with each other, upon reproduction, the zoom on the wide area side and the zoom on the telephoto side do not go back and forth in a short time and such a situation that the user experiences an unwell feeling when monitoring the reproduced image can be avoided.

Subsequently, a case where a shake exists at the time of start of the recording of a moving image will be described with reference to FIG. 7B.

Figure 7B:
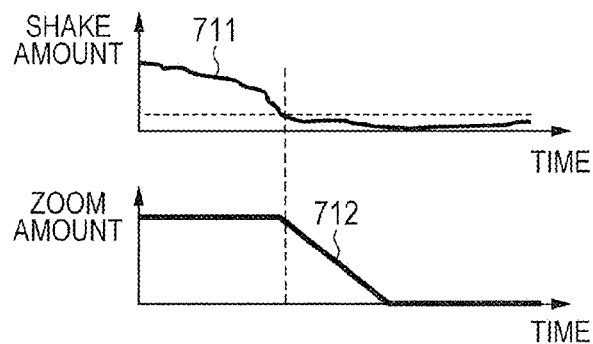
FIG. 7B is a diagram for describing a setting of a reproduction vibration-proofing term by the image reproducing apparatus according to the modification of the first embodiment.

In FIG. 7B, a shake 711 shows a state of the shake which has already occurred at the time of start of the moving image. When the moving image is reproduced, in order to correct the shake 711, the user designates one point in the period of the shake 711. As already described, the image reproducing apparatus (image capturing apparatus 101) operates so as to decide the reproduction vibration-proofing term and the buffer terms. However, the shake 711 has already occurred at the start of the moving image. When the reproduction vibration-proofing term is provided, a buffer term cannot be provided before the reproduction vibration-proofing term. On the other hand, at the end of the moving image, a buffer term cannot be provided after the reproduction vibration-proofing term. Therefore, when the buffer terms are not provided at the edges (start edge and end edge) of the moving image, the image capturing apparatus 101 does not provide the buffer terms but extends the reproduction vibration-proofing term to an edge portion (start position or end position) of the moving image and sets. In this manner, in the reproduction vibration-proofing process at the edge of the moving image, the reproduction vibration-proofing term and the buffer term are set like a term 712 illustrated in FIG. 7B.

According to the modification, the reproduction vibration-proofing term and the buffer term can be effectively set in accordance with an occurrence situation of the shake and, in a manner similar to the first embodiment, in the moving image reproduction in which the reproduction vibration-proofing is performed, such a situation that an unwell feeling is given to the user can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus for example, reading out and executing the computer executable instructions from the storage medium to perform the functions of one more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include network of separate computers or separate processors to read out and execute the computer executable instructions. The computer-executable instructions may be provided to the computer, for example, from a network or the storage medium. The storage medium may include, for example, one or more of a and disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The functions of the embodiments mentioned above are also realized by a method whereby on the basis of instructions of a program code read out by a computer, an OS (basic system or operating system) or the like which is operating on the computer executes a part or all of actual processes. Naturally, such a case is also incorporated in the invention.

Further, a program code read out of a storage medium is written into a memory provided for a function expanding board inserted in a computer or a function expanding unit connected to the computer and, thereafter, processes based on instructions of the program code are executed, and such processes are also incorporated in the invention. That is, naturally, a case where a CPU or the like provided for the function expanding board or the function expanding unit executes a part or all of the actual processes on the basis of the instructions of the Q code and realizes the functions of the embodiments mentioned above is also incorporated in the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-196836, filed on Sep. 26, 2014, which is hereby incorporated by reference herein in its entirety.

What is claimed is:

1. An image reproducing apparatus comprising:
a storing unit configured to store a moving image and shake information of the moving image;
a reproduction vibration-proofing unit configured to electronically execute a reproduction vibration-proofing on a basis of the shake information during a reproduction of the moving image; and
a control unit configured to set a reproduction vibration-proofing term in which the reproduction vibration-proofing is performed and a second zoom magnification which is used in the reproduction vibration-proofing term and differs from a first zoom magnification which is used in a term in which the reproduction vibration-proofing is not performed into the moving image on a basis of the shake information,
wherein the control unit provides a change term in which a zoom magnification is changed from one of the first zoom magnification and the second zoom magnification to the other into at least one of periods before and after the reproduction vibration-proofing term.

2. An apparatus according to claim 1, wherein the control unit sets a range of the moving image in which a shake amount included in the shake information is equal to or larger than a predetermined threshold value as the reproduction vibration-proofing term.

3. An apparatus according to claim 2, wherein the shake amount is a change in an amount of a moving vector between frames constructing the moving image.

4. An apparatus according to claim 1, wherein the control unit provides the change term into both periods before and after the reproduction vibration-proofing term.

5. An apparatus according to claim 1, wherein the control unit determines the second zoom magnification on a basis of a magnitude of a shake amount included in the shake information.

6. An apparatus according to claim 1, wherein the control unit determines a duration of a time of the change term on a basis of a magnitude of a shake amount included in the shake information.

7. An apparatus according to claim 1, wherein when the change term provided after an Nth reproduction vibration-proofing term and the change term provided before an (N+1)th reproduction vibration-proofing term are adjacent, the change term provided after the Nth reproduction vibration-proofing term and the change term provided before the (N+1)th reproduction vibration-proofing term are eliminated, and the Nth reproduction vibration-proofing term and the (N+1)th reproduction vibration-proofing term are combined.

8. An apparatus according to claim 1, wherein a time of the change term has a relation of (change time=constant×maximum zoom magnification)

to the maximum zoom magnification corresponding to a maximum shake amount in the reproduction vibration-proofing term.

9. An image capturing apparatus comprising:
a storing unit configured to store a moving image and shake information of the moving image;
a reproduction vibration-proofing unit configured to electronically execute a reproduction vibration-proofing on a basis of the shake information during a reproduction of the moving image; and
a control unit configured to set a reproduction vibration-proofing term in which the reproduction vibration-proofing is performed and a second zoom magnification which is used in the reproduction vibration-proofing term and differs from a first zoom magnification which is used in a term in which the reproduction vibration-proofing is not performed into the moving image on a basis of the shake information, wherein the control unit provides a change term in which a zoom magnification is changed from one of the first zoom magnification and the second zoom magnification to the other into at least one of periods before and after the reproduction vibration-proofing term.

10. An image reproducing method comprising:

setting a reproduction vibration-proofing term in which a reproduction vibration-proofing is performed and a second zoom magnification which is used in the reproduction vibration-proofing term and differs from a first zoom magnification which is used in a term in which the reproduction vibration-proofing is not performed into a moving image on a basis of shake information of the moving image to be reproduced;

providing a change term in which a zoom magnification is changed from one of the first zoom magnification and the second zoom magnification to the other into at least one of periods before and after the reproduction vibration-proofing term; and electronically executing the reproduction vibration-proofing on a basis of the shake information in the reproduction vibration-proofing term.

11. A non-transitory computer-readable storage medium storing a program for causing a computer to execute:

setting a reproduction vibration-proofing term in which a reproduction vibration-proofing is performed and a second zoom magnification which is used in the reproduction vibration-proofing term and differs from a first zoom magnification which is used in a term in which the reproduction vibration-proofing is not performed into a moving image on a basis of shake information of the moving image to be reproduced;

providing a change term in which a zoom magnification is changed from one of the first zoom magnification and the second zoom magnification to the other into at least one of periods before and after the reproduction vibration-proofing term; and electronically executing the reproduction vibration-proofing on a basis of the shake information in the reproduction vibration-proofing term during the reproduction of the moving image.

* * * * *